(12) United States Patent
Ebata et al.

(10) Patent No.: US 7,437,603 B2
(45) Date of Patent: Oct. 14, 2008

(54) METHOD FOR RESTORING SNAPSHOT IN A STORAGE SYSTEM

(75) Inventors: Atsushi Ebata, Fuchu (JP); Atsushi Sutoh, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 505 days.

(21) Appl. No.: 11/331,087

(22) Filed: Jan. 13, 2006

(65) Prior Publication Data

US 2007/0174669 A1 Jul. 26, 2007

(30) Foreign Application Priority Data

Nov. 8, 2005 (JP) ............................. 2005-323323

(51) Int. Cl.
*G06F 11/00* (2006.01)
(52) U.S. Cl. .......................................... 714/6; 711/162
(58) Field of Classification Search ....................... None
See application file for complete search history.

(56) References Cited

U.S. PATENT DOCUMENTS

| | | | |
|---|---|---|---|
| 6,182,198 B1 * | 1/2001 | Hubis et al. ................. | 711/162 |
| 6,771,843 B1 | 8/2004 | Huber et al. | |
| 7,360,046 B2 * | 4/2008 | Shono et al. ................ | 711/162 |
| 2004/0030951 A1 * | 2/2004 | Armangau ...................... | 714/6 |
| 2005/0223180 A1 * | 10/2005 | Derbeko ....................... | 711/162 |
| 2006/0259725 A1 * | 11/2006 | Saika et al. .................. | 711/162 |
| 2007/0011402 A1 * | 1/2007 | Sato et al. .................... | 711/114 |
| 2007/0186067 A1 * | 8/2007 | Nagata et al. ............... | 711/162 |
| 2007/0198605 A1 * | 8/2007 | Saika .......................... | 707/202 |
| 2007/0271426 A1 * | 11/2007 | Watanabe et al. ........... | 711/159 |

OTHER PUBLICATIONS

A Thorough Introduction to FlexClone™ Volumes, Klivansky, et al. Network Appliance Inc. Oct. 2004, pp. 1-34.

* cited by examiner

*Primary Examiner*—Christopher S McCarthy
(74) *Attorney, Agent, or Firm*—Mattingly, Stanger, Malur & Brundidge, P.C.

(57) ABSTRACT

Provided is a technique which solves a problem of a long-time reduction in a service level after service restoration and a problem of a failure caused by a disk capacity shortage during primary volume restoration. According to the technique, reference is made to a differential block management unit (217) setting which of a differential volume (142) and a primary volume (141) a data block of a restoring source snapshot volume (VVOL No. 3) is to determine which of the primary volume (141) and the differential volume (142) a volume storing read data is. When a restoring target data block is in a differential volume (142), data of the differential volume (142) is restored in the primary volume (141). Upon accessing to the primary volume (141) while restoring, switching is made to a virtual primary volume after restoration where data of the primary and differential volumes are combined based on the snapshot volume (VVOL No. 3) to execute accessing.

12 Claims, 15 Drawing Sheets

FIG. 6

203 DIFFERENTIAL BLOCK MANAGEMENT TABLE

| Block No. / VVOL No. | 1 | 2 | ... | 122 | 123 | 124 | ... | n | PRIMARY VOLUME ID | DIFFERENTIAL VOLUME ID |
|---|---|---|---|---|---|---|---|---|---|---|
| No.1 | 0 | 0 | ... | 0 | 0 | 0 | ... | 0 | 0006 | 0012 |
| No.2 | 0 | 0 | ... | 0 | 0 | 0 | ... | 0 | 0013 | 0014 |
| No.3 | 0 | 0 | ... | 0 | 456 | 0 | ... | 0 | 0001 | 0005 |
| : | : | : | ... | : | : | : | ... | : | | |
| No.m | 0 | 0 | ... | 0 | 0 | 0 | ... | 0 | | |

VVOL(No3)'s #2 block maps PVOL Block#2

VVOL(No3)'s #123 block maps DVOL Block#456

215

RESTORING PROCESS NUMBER COUNTER 216

0003

RESTORING MANAGEMENT TABLE 217

| BACKGROUND RESTORING NUMBER | RESTORING DESTINATION VOLUME IDENTIFIER | RESTORING SOURCE VOLUME IDENTIFIER | BLOCK NUMBER WHILE RESTORING | ACCESSED BLOCK BITMAP POINTER |
|---|---|---|---|---|
| 0 | 0001 | 0005 | 0225 | 0x00000001 |
| 1 | 0006 | 0012 | 1055 | 0x00001001 |
| 2 | 0013 | 0013 | 5862 | 0x00002001 |
| 3 | NONE | NONE | NONE | NONE |
| 4 | NONE | NONE | NONE | NONE |
| 5 | NONE | NONE | NONE | NONE |

301　302　303　304　305

ACCESSED BLOCK BITMAP 218

BLOCK ADDRESS
0 ──────────────▶ n

METHOD FOR RESTORING SNAPSHOT IN A STORAGE SYSTEM

CLAIM OF PRIORITY

The present application claims priority from Japanese application P2005-323323 filed on Nov. 8, 2005, the content of which is hereby incorporated by reference into this application.

BACKGROUND OF THE INVENTION

This invention relates to a snapshot of data stored in a storage system and a method for restoring a snapshot.

Frequently used as a storage system for storing corporate data is a network attached storage (NAS) connected to a local area network (LAN) to inexpensively and easily manage files. Main services provided by the NAS include file sharing services and snapshot services. The file sharing services make a NAS file system open to a plurality of NAS clients connected to the LAN to enable creation and reading of files. The snapshot services provide a snapshot which is a still image obtained at a certain time of a file system which is being run (running file system) to NAS clients. When files of the running file system are lost or destroyed by human mistakes, application faults, or the like, by rewriting a file left in the snapshot in the running file system, it is possible to restore data at the time of creating the snapshot.

Recently, the NAS has been used in many corporate backbone systems or large-scale web systems. In such a system, data availability is important. Thus, there has been an increase in demand for restoring the file system run up to then with a consistent data set as early as possible when data of the running file system is lost or destroyed.

To meet the demand, the NAS must be provided with a function of instantaneously restoring data of snapshots of a consistent data set in the running file system. Hereinafter, this function will be referred to as instantaneous restoration. As a technology of realizing instantaneous restoration, for example, a technology described in U.S. Pat. No. 6,771,843 is known. According to this technology, a writable snapshot with a file system being run (running file system) set as a master is instantaneously created. Even when data of the running file system is destroyed, by remounting the writable snapshot in the running file system, it is possible to instantaneously resume running with consistent data at the time of creating the snapshot. Additionally, by using split processing for physically splitting a master volume and a snapshot volume from each other as described in "Outline of Flex Clone Volume" (P. 4 to 6, retrieved online on Sep. 17, 2005, Internet <http://www-jp.netapp.com/tec_library/ftp/3347.pdf>), it is possible to grade up the snapshot volume to the same original primary volume. The instantaneous restoration is realized by these two functions.

Next, description will be made on a procedure necessary for an administrator to realize instantaneous restoration by using the technologies described in U.S. Pat. No. 6,771,843 and "Outline of Flex Clone Volume". First, during NAS running, as in the case of normal read-only snapshots, the administrator periodically creates snapshots which are copies of primary volumes storing data of the running file system. Then, when the data of the primary volume is destroyed due to a certain fault, a snapshot having a data set to be restored is selected, and the running file system is mounted again in the snapshot volume.

Thus, the running file system seems to be instantaneously restored by the past snapshot. Subsequently, the administrator explicitly starts split processing. In the split processing, data in a master volume shared by the master volume and the snapshot is copied to the snapshot volume. After completion of this processing, the snapshot volume having the running file system mounted thereon can be used in the same state as that of the primary volume before the fault generation.

SUMMARY OF THE INVENTION

However, according to the writable snapshot creation technology of U.S. Pat. No. 6,771,843, the snapshot volume stores data alone written in the volume after the creation and, for other data, the data stored in the primary volume as the master volume is shared with the primary volume. The split processing described in "Outline of Flex Clone Volume" is for copying the data in the master volume shared by the master volume and a clone volume to the clone volume. Thus, as the volume of data stored in the primary volume is larger, or as a data updating amount from clone creation to the primary volume is smaller, the greater amount of shared data is copied from the primary volume to the clone volume in the split processing.

As a result, a high load state of the entire NAS is continued for a long time. Accordingly, even when the running is instantaneously restored, a reduced state of a service level continues for a long time. As the split processing is for data copying, a disk capacity of the entire NAS becomes short during restoring processing, causing failures on the midway. In other words, according to "Outline of Flex Clone Volume", clones of the master volume are periodically created. When restoration is executed, a clone is selected to copy data shared by the master volume and the selected clone to the clone volume. In this case, as the volume of data lost from the master volume is smaller (the volume of data shared by the master volume and the clone is larger), a load of the copying processing of a background is higher. Even when a secondary clone volume of master volume copying is equal in capacity, if the volume of selected data is large, the capacity of the copying secondary clone volume becomes short to stop restoration.

This invention has been made in view of the above problems, and it is an object of the invention to prevent a problem of a long-time reduction in a service level after service restoration even when a data updating amount of a primary volume after snapshot acquisition is small, and a problem of a failure caused by a disk capacity shortage during primary volume restoration.

According to this invention, there is provided a method for storing a snapshot, which causes a storage system to execute restoring processing by overwriting a primary volume with data of a snapshot volume, the storage system including: the primary volume for storing data to be accessed by a client computer; the snapshot volume for holding a snapshot of the primary volume; and a differential volume for storing differential data between the primary volume and the snapshot volume, the method including the steps of: causing the storage system to receive a restoring starting command containing a restoring source snapshot volume from a management computer; referring to a differential block management unit presetting in which of data blocks of the differential volume and the primary volume a data block of the restoring source snapshot volume is present based on the received restoring starting command to determine which of the primary volume and the differential volume a volume storing real data is for a restoring target data block; copying data stored in the data block of the differential volume indicated by the differential block management unit to the data block of the primary volume to execute restoring when the restoring target data block is the differential volume; receiving a request of accessing the primary volume from the client computer while restoring; switching to accessing to a virtual primary volume after restoration where data of the primary volume and data of the differential volume are combined together based on the snapshot volume; and executing the accessing request from the client computer to the virtual primary volume.

Therefore, according to this invention, the client computer can access the storage system in the state after the completion of the restoration immediately after the start of the restoration. As the restoring processing only needs to copy the update differential data alone from the differential volume to the primary volume, the volume of data to be transferred is lowered to reduce a load on the storage system while restoring, whereby it is possible to prevent a reduction in access performance which has conventionally occurred due to a high load on the storage system. Moreover, as the data restored from the differential volume to the primary volume is an update difference of the primary volume, it is possible to surely prevent a shortage of a disk capacity of the primary volume while restoring which has conventionally occurred.

BRIEF DESCRIPTION OF THE DRAWINGS

FIG. 6 is an explanatory diagram showing an example of a differential block management table.

DETAILED DESCRIPTION OF THE PREFERRED EMBODIMENT

Hereinafter, description will be made on an embodiment of this invention below with reference to the accompanying drawings.

(Entire Configuration of System)

Figure 1:
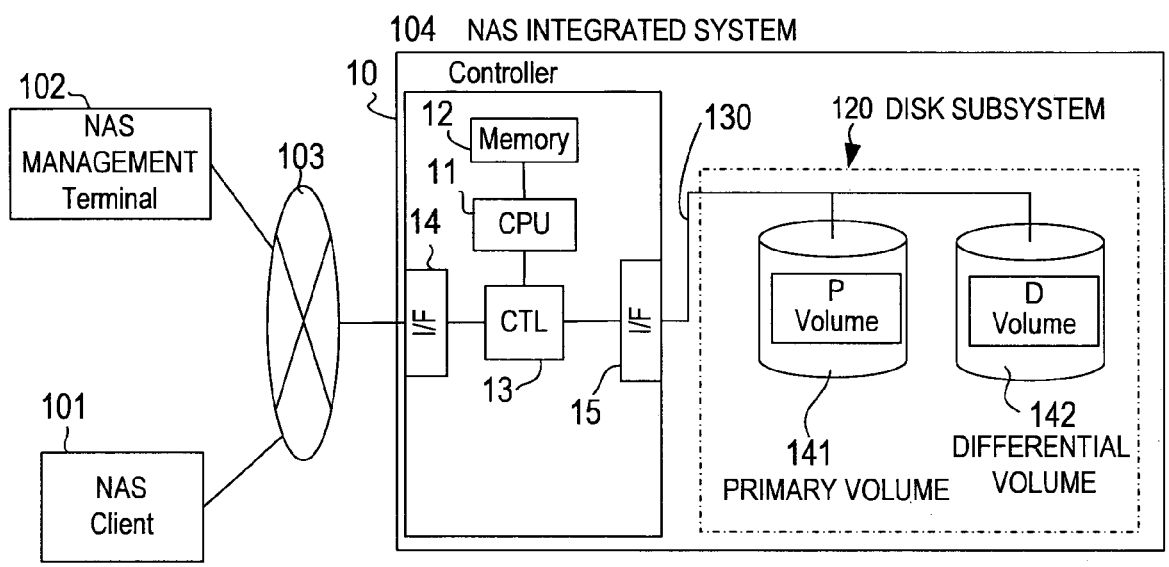
FIG. 1 is a block diagram showing an entire configuration of an information system according to an embodiment of this invention.

FIG. 1 is a block diagram showing an entire configuration of an information system which includes a first embodiment of this invention. A NAS client 101 is connected to a NAS integrated system 104 through a network 103. In this case, the network 103 may be LAN, Internet, or WAN. A NAS management terminal 102 that controls the NAS integrated system 104 is connected to the network 103.

The NAS integrated system 104 provides file sharing services, snapshot services realized by a well-known technology, and instantaneous restoration realized by this invention to the NAS client 101. Hereinafter, these services will be generically referred to as NAS services.

The NAS integrated system 104 includes a disk subsystem 120 equipped with a plurality of disk drives, and a controller 10 for controlling the disk subsystem 120. The controller 10 constitutes a NAS server subsystem 110 described below.

In the controller 10 of the NAS integrated system 104, there are provided a CPU 11, a memory 12, a data transfer controller 13, a network interface 14, and a storage interface (e.g., host bus adapter) 15. A data cache (not shown) may be disposed in the memory 12 or in the data transfer controller 13 side.

Figure 2:
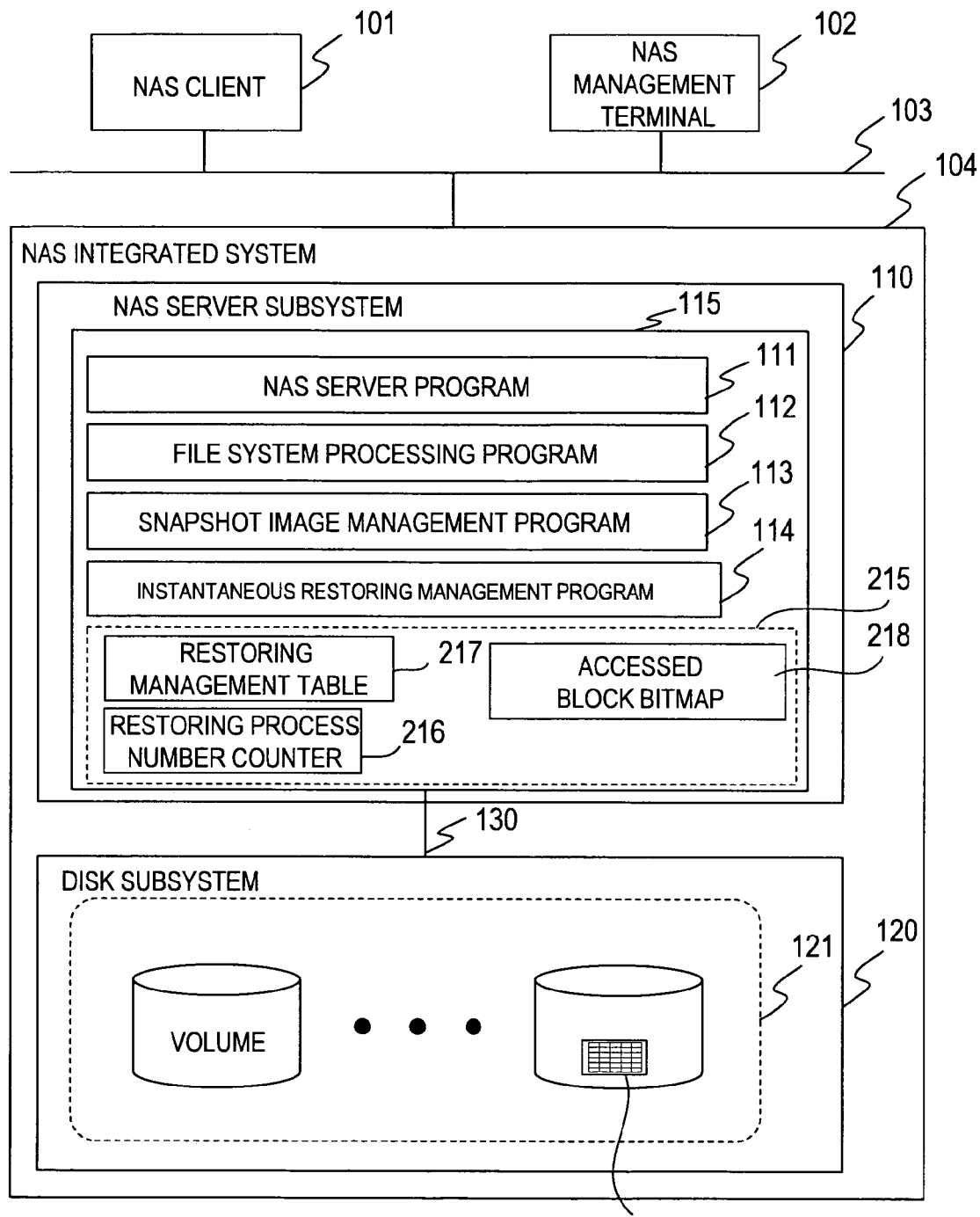
FIG. 2 is a block diagram showing a function of a NAS integrated system.

A control program described below and shown in FIG. 2 is loaded in the memory 12, and the CPU 11 loads and executes the control program to perform various processing operations.

The data transfer controller 13 transfers data among the CPU 11, the network interface 14, the storage interface 15, and the memory 12.

In the disk subsystem 120, a primary volume 141 for data reading/writing by the NAS client 101, and a differential volume 142 for storing update differential data between the primary volume (main volume) 141 and a snapshot volume (virtual snapshot volume) are set. As shown in FIG. 2, the differential volume 142 stores a differential block management table (copy on write table) 203 for managing a snapshot (snapshot volume) of the primary volume 141. Though not shown, it is presumed that there are pluralities of primary volumes 141 and differential volumes 142 accessed by the NAS client 101.

FIG. 2 is a block diagram showing functions of the NAS integrated system 104. The NAS integrated system 104 includes a NAS server subsystem 110 on which a NAS server program group 115 is mounted to execute processing for NAS services, a disk subsystem 120 having a physical volume 121 mounted thereon to store real data, and an internal network 130 for interconnecting these components. The internal network 130 may be a dedicated bus incorporated in the system, or a general-purpose network such as SAN or LAN.

The NAS server program group 115 includes a NAS server program 111 which is a well-known technology, a file system processing program 112, a snapshot image management program (snapshot image management unit) 113, and an instantaneous restoring management program 114 of this invention. This program group 115 executes processing for receiving a command from the NAS management terminal 102 through the network 103 to provide services.

The NAS server program 111 reads/writes a file or a directory in the file system processing program 112 according to a file accessing request from the NAS client 101, and returns its result to the client 101 as the request source.

The file system processing program 112 issues a volume storing a file or a directory, a block (data block) position to be accessed, reading or writing processing of data whose size has been designated to the snapshot image management program 113 according to a request of reading/writing a file or a directory which is issued by the NAS server program 111.

Figure 3:
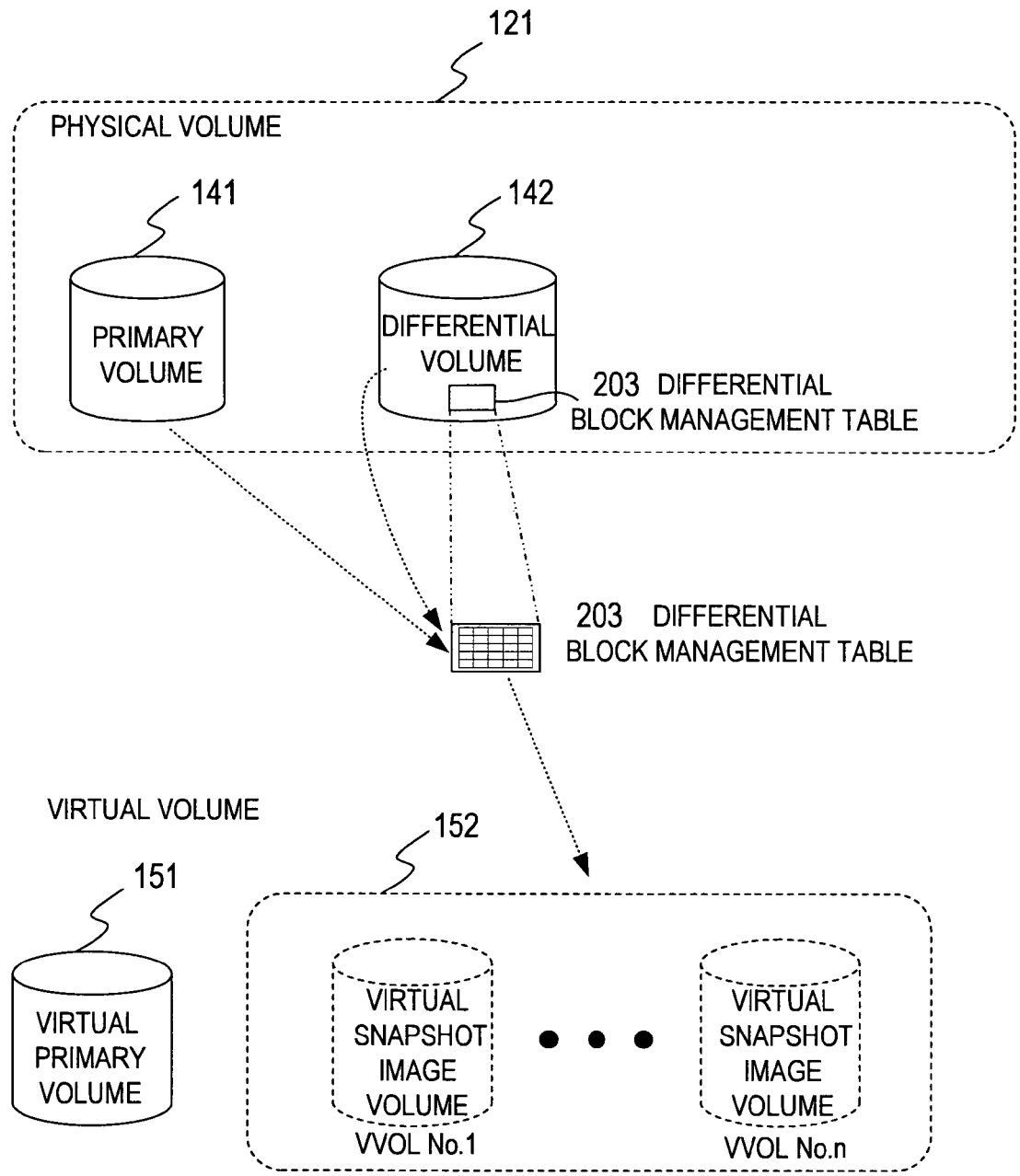
FIG. 3 is an explanatory diagram showing a relation between a physical volume and a virtual volume group provided by a snapshot image management program.

The snapshot image management program 113 manages a disk area of the disk subsystem 120 by a logical area called a volume, and processes snapshots. FIG. 3 shows a relation between a physical volume and a virtual volume group provided by the snapshot image management program 113. This snapshot image management program 113 manages the differential volume 142 which is a volume to store differential data necessary for maintaining the snapshot in addition to the primary volume 141 to store a running file system. Data of primary and differential volumes 141 and 142 are combined together to create a virtual snapshot volume 152 which is a virtual volume to provide a past still image of the primary volume 141.

Thus, the snapshot image management program 113 manages the differential block management table (differential block management unit) 203 stored in the differential volume 142, and reads data of a block indicated by the differential block management table 203 among data stored in the primary and differential volumes 141 and 142, thereby generating a virtual snapshot volume (virtual volume) 152. This snapshot image management program 113 receives a request of writing/reading in each volume from the file system to execute processing accordingly.

As shown in FIG. 3, the snapshot image management program 113 periodically obtains snapshots (e.g., every hour) to generate a plurality of virtual snapshot volumes VVOL (No. 1) to (No. n) as virtual snapshot volumes 152. These virtual snapshot volumes 152 are substantially not physical volumes but virtual volumes managed by the differential block management table (cow table of the drawing) 203.

The instantaneous restoring management program 114 restores data from the differential volume 142 to the primary volume 141 based on the differential block management table 203, and creates a writable virtual volume (virtual primary volume 151) which is an image obtained by combining the primary volume 141 and the snapshot volume 152 to give a false appearance of instantaneous completion of restoring from the snapshot to the primary volume 141. During execution of the instantaneous restoring management program 114, a value of a restoring process number counter 216 in the memory 12 is changed to migrate from the primary volume 141 to the virtual primary volume 151 in a transmissive manner seen from the file system.

(Structure of Snapshot Image Management Program)

Figure 4:
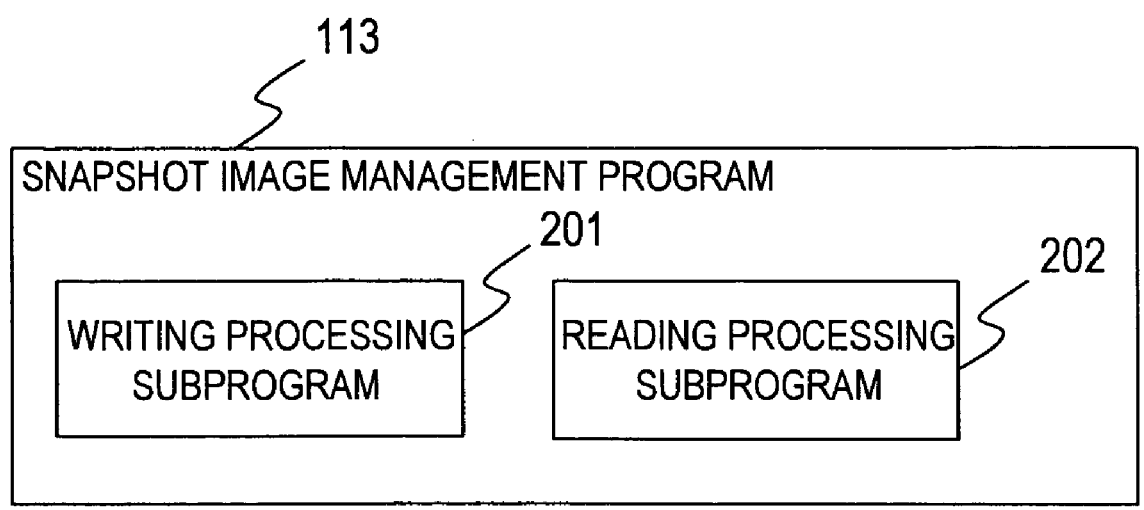
FIG. 4 is a block diagram showing a structure of a snapshot image management program.

FIG. 4 is a diagram showing the snapshot image management program 113 which is a well-known technology. The snapshot image management program 113 loads one of a writing processing subprogram 201 and a reading processing subprogram 202 according to a processing request issued from the file system processing program 112. These subprograms refer to/update the differential block management table 203 indicating a correlation of arrangement of real data present in one of the virtual snapshot volume 152, the primary volume 141, and the differential volume 142 to provide snapshots.

Figure 5:
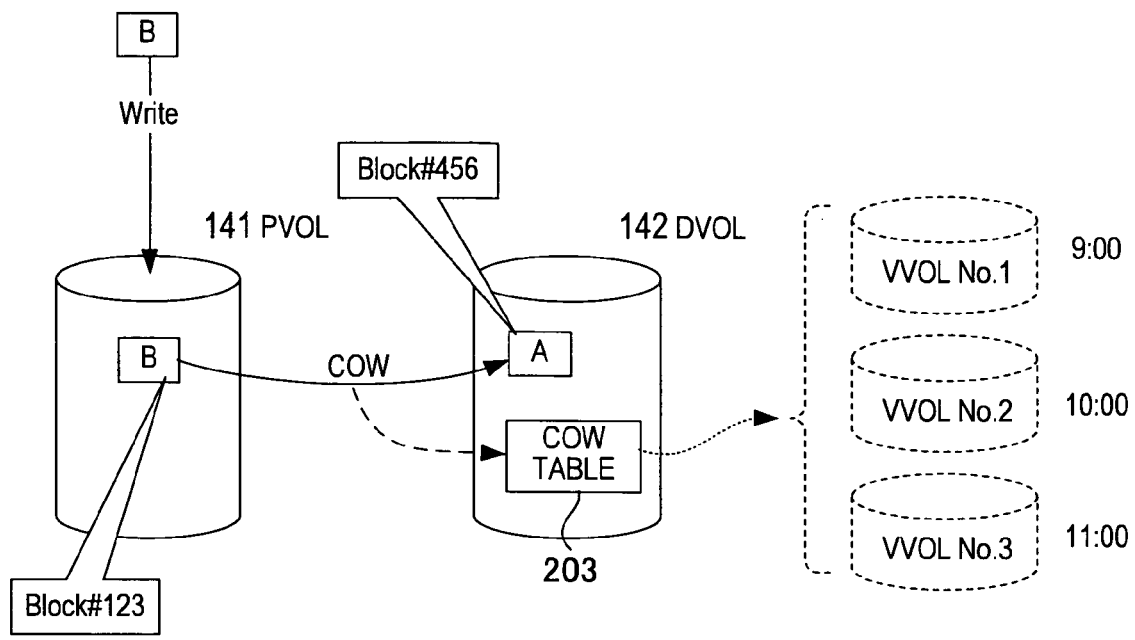
FIG. 5 is an explanatory diagram showing an example of a differential snapshot.

As shown in FIG. 5, upon writing (updating) in the primary volume 141, the snapshot image management program 113 executes copy-on write processing to retreat data before updating to the differential volume 142, and subsequently writes new data in the primary volume 141. FIG. 5 shows a case of writing data B in the primary volume 141. Information of an update difference is written in the differential block management table 203, and a differential snapshot is managed as a virtual snapshot volume. In this case, the writing processing subprogram 201 functions as follows.

A block #456 for retreating is allocated in the differential volume 142 to retreat certain old data A from a block #123 of the primary volume 141 for writing the data B. The data A of the block #123 of the primary volume 141 is written in the block #456 of the differential volume 142 to be retreated. After completion of the retreating of the old data A, new data B is written in the block #123 of the primary volume 141. Further, the writing processing subprogram 201 writes the block #456 of the differential volume 142 in a current snapshot position of the differential block management table 203 to finish the processing.

As shown in FIG. 6, the differential block management table 203 contains a VVOL number 2031 indicating a generation of a snapshot volume 152, a block address 2032 indicating a block position of each snapshot volume 152, and a data state 2033 of the positions indicated by the VVOL number 2031 and the block address 2032. The differential block management table 203 holds identifiers of the primary and differential volumes 141 and 142 for each VVOL number 2031.

The data state 2033 indicates data of the same block address as that of the primary volume (PVOL) 141 when a value is 0, and a block address of the differential volume 142 when a value is not 0. For example, as shown in FIG. 5, when updated data B is obtained by a snapshot volume No. 3, 456 is written as a block address of the differential volume 142 in the data state 2033 where the VVOL number 2031 is No. 3 and the block address 2032 is 123. Accordingly, when data of the snapshot volume VVOL No. 3 is read, data of the same block address as that of the primary volume 141 is read for block addresses 1 to 122, and 124 to n, and data of the block address 123 is read from the block address 456 of the differential volume 142. Thus, the differential block management table 203 sets a correlation among the data block of the differential volume 142 storing update differential data, the data block of the primary volume 141 of the update differential data, and the data block of the snapshot volume 152.

(Structure of Instantaneous Restoring Management Program)

Figure 7:
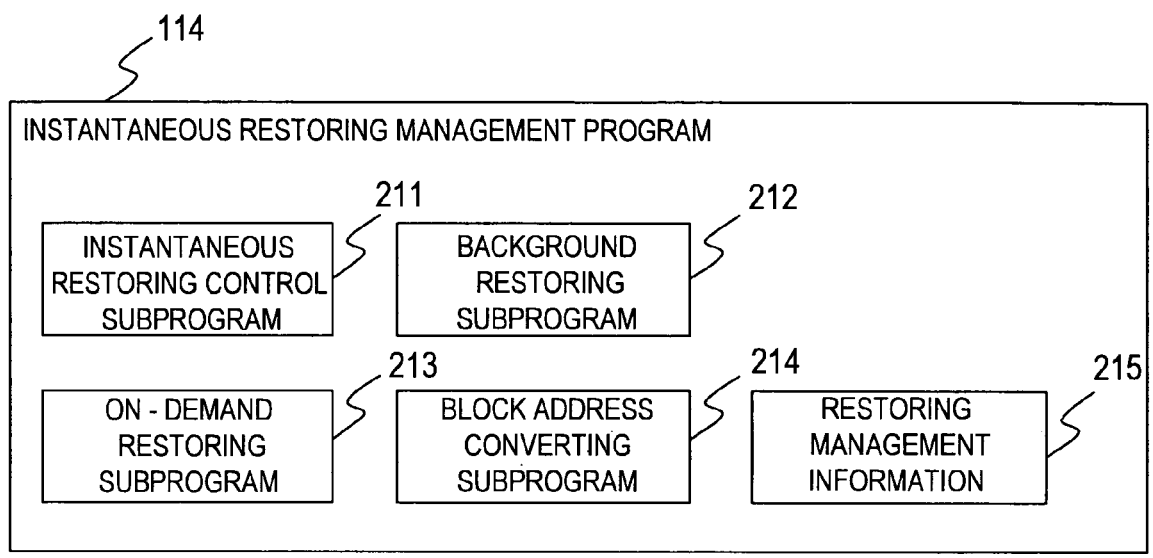
FIG. 7 is a block diagram showing a structure of an instantaneous restoring management program.

FIG. 7 is a block diagram showing a structure of the instantaneous restoring management program 114 of this invention. The instantaneous restoring management program 114 includes an instantaneous restoring control subprogram 211, a background restoring subprogram 212, an on-demand restoring subprogram 213, a block address converting subprogram 214, and restoring management information 215.

The instantaneous restoring control subprogram 211 causes the administrator to receive an instantaneous restoring request instructed from the NAS management terminal 102, and to control an entire processing flow of instantaneous restoring.

The background subprogram 212 restores data of blocks stored in the differential volume 142 from the virtual snapshot volume 152 designated as a restoring source to a designated primary volume in defined order.

In this case, the order of blocks to be restored may be ascending or descending order, or order of statistical values such as access frequencies. When a restoring target block has been restored by another subprogram, a next block is restored without restoring a selected block.

The on-demand restoring subprogram 213 is loaded by the writing processing subprogram 201 during an operation of the background restoring subprogram 212 to realize writing in the virtual primary volume 151. As described below, the on-demand restoring subprogram 213 executes restoring for a block on demand when data to be written is present in the restoration-uncompleted block. Accordingly, latest data after writing processing is prevented from being overwritten by the restoring executed on the background. This on-demand restoring is unnecessary when writing target data matches the block. According to the embodiment, however, on-demand restoring is carried out irrespective of coincidence/noncoincidence between the writing target data and the block to simplify control.

The block address converting subprogram 214 is loaded by the reading processing subprogram 202 during the background restoring operation to realize reading from the virtual primary volume 151. In the virtual primary volume 151, a restored block is substantially stored in the same block number as that of the primary volume 141, while a restoration-uncompleted block is substantially stored in the same block number as that of a restoring source snapshot volume 152. Thus, when a reading target block has not been restored, the block address converting subprogram 214 changes a reading target volume from the primary volume 141 to the restoring source snapshot volume 152 to pass it to the reading processing subprogram.

The restoring management information 215 is used by a subprogram group in the instantaneous restoring control subprogram 211 to manage instantaneous restoring, and indicates a progress of restoring processing. This information is normally stored in the memory 12 of the NAS server subsystem 110. However, it may be stored in a volume of the disk subsystem 120 in consideration of reliability.

(Data Structure Processed by Instantaneous Restoring Management Program)

Figure 8:
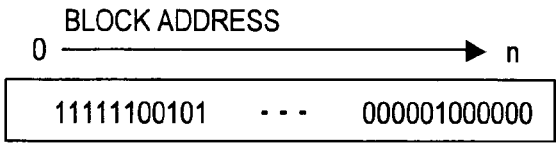
FIG. 8 is a block diagram showing a structure of instantaneous restoring management information 215.

FIG. 8 is a block diagram showing a structure of the instantaneous restoring management program 215. The instantaneous restoring management information 215 includes a restoring process number counter 216, a restoring management table 217, and an accessed block bitmap 218.

The restoring process number counter 216 shows a number where the background restoring subprogram 212 is started. This restoring process number counter 216 is incremented/decremented by a start/end of the background restoring subprogram 212. The counter 216 is used for judging whether the writing processing subprogram 201 and the reading processing subprogram 202 respectively need to load the on-demand restoring subprogram 213 and the block address converting subprogram 214.

The restoring management table 217 is used for managing execution of a plurality of background restoring operations for different primary volumes 141. This restoring management table 217 contains a column 301 indicating background restoring numbers, a column 302 indicating identifiers of restoring destination primary volumes, a column 303 indicating identifiers of restoring source snapshot volumes, a column 304 indicating block numbers of restoring source volumes (snapshot volumes 152) while restoring, and a pointer of an accessed block bitmap 218 described below. By referring to the restoring management table 217, it is possible to understand a current block for which restoring processing indicated by the background restoring number 301 is executed.

The accessed block bitmap 218 is set for each background restoring number 301, and used (as access management unit) for managing a restored block and a nonrestored block of a primary volume (restoring destination volume). It is a management map or a management table arranged in the memory 12. In other words, the accessed block bitmap 218 holds restoring history (accessing history by restoring) by data block units of a restoring destination primary volume. One bit of the accessed block bitmap 218 corresponds to one block of the primary volume 141. Thus, this bitmap 218 has a bit width equivalent to the number of blocks constituting the volume. The embodiment shows that a corresponding block has been restored when a bit value is 1, while a corresponding block has not been restored when bit value is 0.

(Processing Flow of Instantaneous Restoring Control Subprogram)

Figure 9:
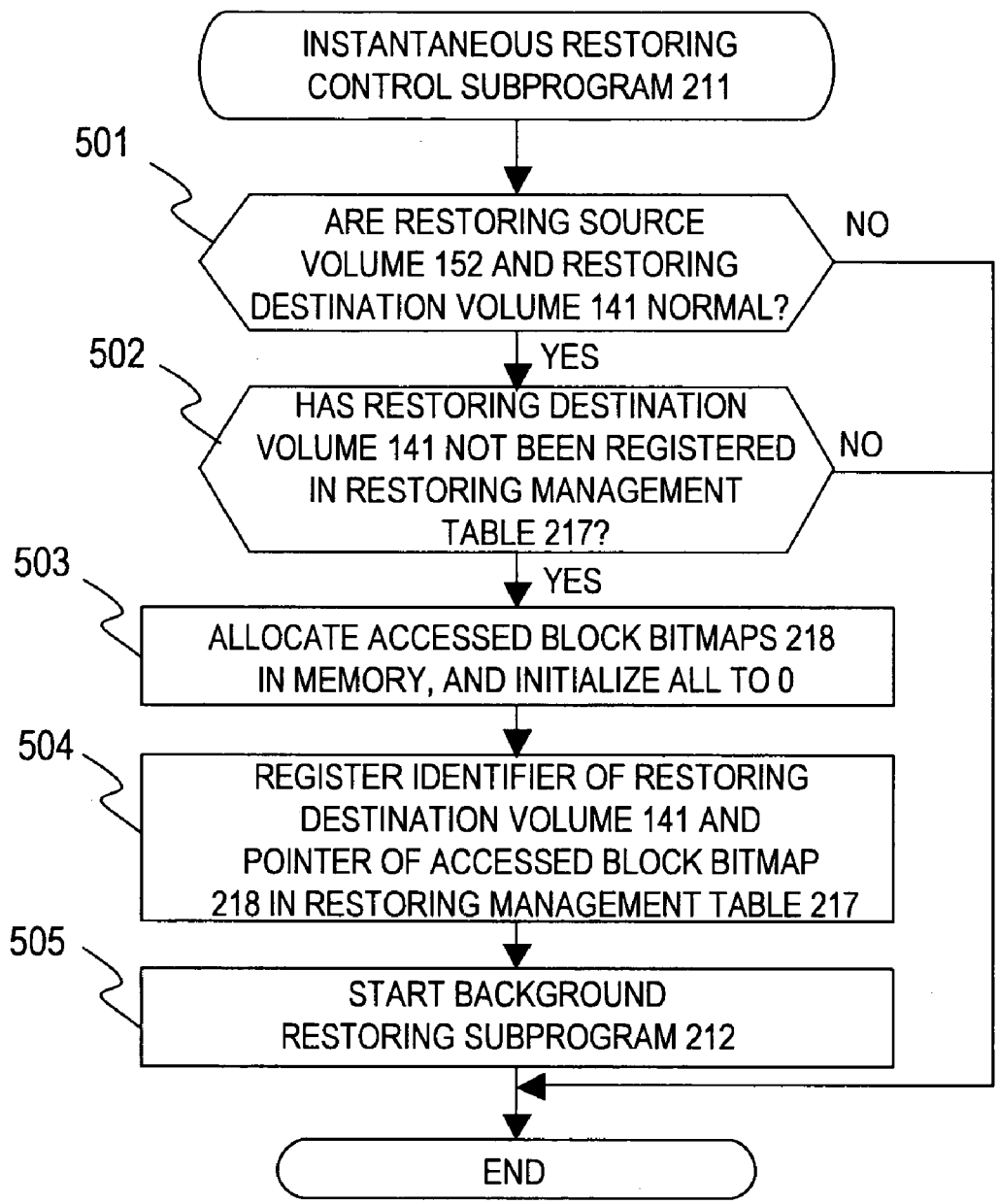
FIG. 9 is a flowchart showing an example of instantaneous restoring processing of an instantaneous restoring control subprogram.

FIG. 9 is a flowchart showing entire instantaneous restoring processing executed by the instantaneous restoring control subprogram 211. Upon reception of an instantaneous restoring starting instruction from the NAS management terminal 102, the instantaneous restoring control subprogram 211 first checks whether a restoring source virtual snapshot volume 152 and a restoring destination primary volume 141 are normal or not (501). The restoring source virtual snapshot volume 152 is instructed from the NAS management terminal 102 by the administrator, and a restoring destination volume becomes a primary volume 141 indicated by the virtual snapshot volume 152.

When one or both volumes are abnormal, processing thereafter is not executed to finish the instantaneous restoring. When both volumes are normal, checking is made as to whether the restoring destination volume 141 has not been registered in the restoring management table 217 (502). When the restoring destination volume 141 is not non-registered but has been registered in the restoring management table 217, as another instantaneous restoring is in the middle of restoring a restoring destination primary volume on the background, processing thereafter is not executed to finish the instantaneous processing. On other hand, when the restoring destination volume has not been registered in the restoring management table 217, an accessed block bitmap 218 having a bit number equal to or more than the number of blocks of the restoring destination primary volume is allocated in the memory 12, and all bits are initialized to "0" (503).

After all the bits of the accessed block bitmap 218 have been initialized, this subprogram 211 sets an identifier of the restoring destination primary volume 141 in the column 302 of the restoring management table 217 shown in FIG. 8, and an identifier of the restoring source virtual snapshot volume 152 in the column 303 of the table 217, and registers a pointer of the accessed block bitmap 218. Lastly, the background restoring subprogram 212 is started to finish the processing (505).

(Processing Flow of Background Restoring Subprogram)

Figure 10:
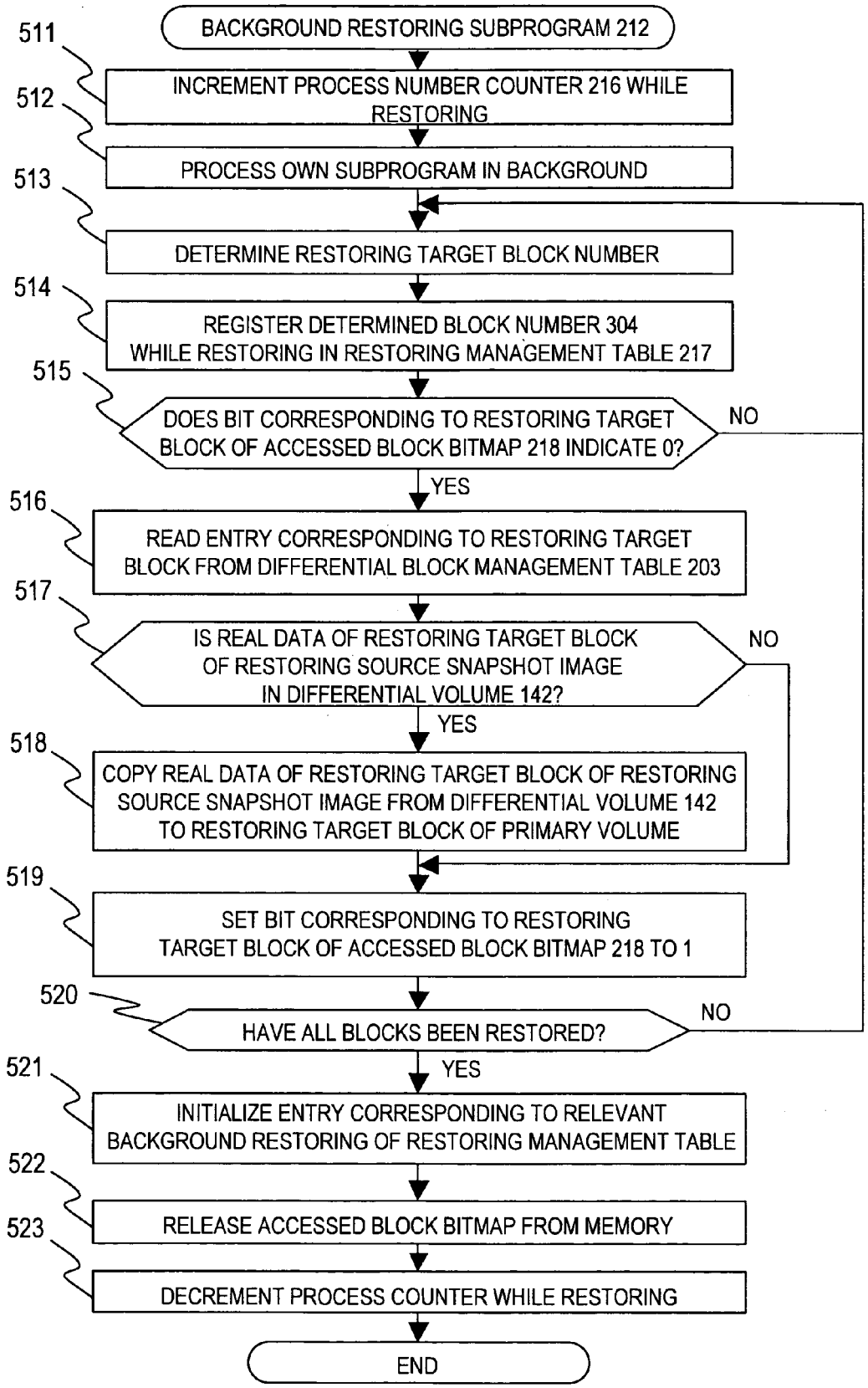
FIG. 10 is a flowchart showing processing of a background restoring subprogram.

FIG. 10 is a flowchart showing entire processing of the background restoring subprogram 212. When it is started by the instantaneous restoring control subprogram 211, the background restoring subprogram 212 first increments the restoring process number counter 216 (511). When this counter 216 is 1 or more, the on-demand restoring subprogram 213 and the block address converting subprogram 214 are made valid to be loaded by the writing processing subprogram 201 and the reading processing subprogram 202. Then, own subprogram 212 is subjected to background processing (512). After completion of step 512, a response is returned from the instantaneous restoring control subprogram 211 to the NAS management terminal 102. Accordingly, it seems to the administrator that the restoring has been completed immediately after an input of a command.

Next, the background restoring subprogram 212 decides a restoring target block number (513). According to a method of deciding a block number, a number may be incremented from a head of a volume, or may be decremented from a last of the volume. Alternatively, statistics of accessing frequencies to a block may be taken to decide a block number from that of a low accessing frequency.

Then, the decided block number is registered in the block number 304 while restoring in the restoring management table 217 (514). Checking is made as to whether a bit corresponding to the block number of the restoring target block in the accessed block bitmap 218 is 0 or not (515). When the corresponding bit is 1 (not 0), as the selected block has been accessed by the own subprogram or the on-demand restoring subprogram 213, processing thereafter is not executed to return to step (513) of deciding a next restoring target block number. On the other hand, when the corresponding bit of the background restoring subprogram 212 is 0, as the selected block has not been accessed by the own subprogram 212 or the on-demand restoring subprogram 213, processing to execute restoring is continued.

Next, an entry corresponding to the restoring target block is read from the differential block management table 203 (516), and reference is made to an arranging address of the restoring target block in the entry to check whether real data of the restoring target block of the restoring source snapshot is in the differential volume 142 or not (517). If the real data of the restoring target block has been stored in the differential volume 142, this subprogram 212 copies the real data from a storing destination block of the differential volume 142 to the restoring target block of the primary volume 141 (518). If the real data of the restoring target block has not been stored in the differential volume 142, step 518 is skipped as the real data is in the primary volume 141. Thus, since the restoring or the checking of restoring has been completed, the bit of the accessed block bitmap 218 corresponding to the restoring target block is set to 1.

Then, judgment is made as to whether restoring has been completed or not for all the blocks (520). In other words, judgment is made as to whether all the bits of the accessed block bitmap 218 have become 1 or not. As restoring has not been completed for all the blocks if there is a bit of 0, the processing returns to step 513 to continue restoring of the data blocks. If restoring has been completed for all the blocks, an own process entry of the restoring management table 217 is initialized (521), the accessed block bitmap 218 is released from the memory 12 (522), and the restoring process number counter is lastly decremented to finish the processing.

Through the processing operations of FIGS. 9 and 10, upon reception of the restoring command, the NAS integrated system 104 copies data from the differential volume 142 to the primary volume 141 to realize contents of the designated virtual snapshot volume 152 by using the restored block bitmap 208, the differential block management table 203, and the restoring management table 217. According to the restoring of this invention, the differential data alone between the virtual snapshot volume 152 and the primary volume 141 needs to be transferred. Thus, a data transfer amount from the differential volume 142 to the primary volume 141 can be greatly reduced, whereby a load of restoring processing can be reduced.

According to "Outline of Flex Clone Volume", when clones of a master volume are periodically created, and data shard by a selected clone and the master volume is copied to the clone volume during restoring, a load of background copying processing is higher as the amount of data lost from the master volume is smaller (as amount of data shared by the master volume and the clone is larger).

On the other hand, according to this invention, as the differential data alone between the snapshot volume 152 and the primary volume 141 is copied, it is possible to realize restoring processing with a lower load as compared with the conventional example.

According to "Outline of Flex Clone Volume", as the data of the master volume and the selected clone are copied to the clone volume, a capacity of a copying primary clone volume may become short to interrupt restoring when a clone capacity is large.

On the other hand, according to this invention, as the update difference block only needs to be returned from the differential volume 142 to the primary volume 141 based on the virtual snapshot volume 152, the data amount of the primary volume 141 is equal to that of the block indicated by the snapshot volume 152, and never exceeds the primary volume 141. Accordingly, a situation of a capacity shortage by the restoring processing of the conventional example can be surely prevented, whereby reliability of the restoring processing can be improved.

(Processing Flows of Writing Processing Subprogram and ON-Demand Restoring Processing Program)

Figure 11:
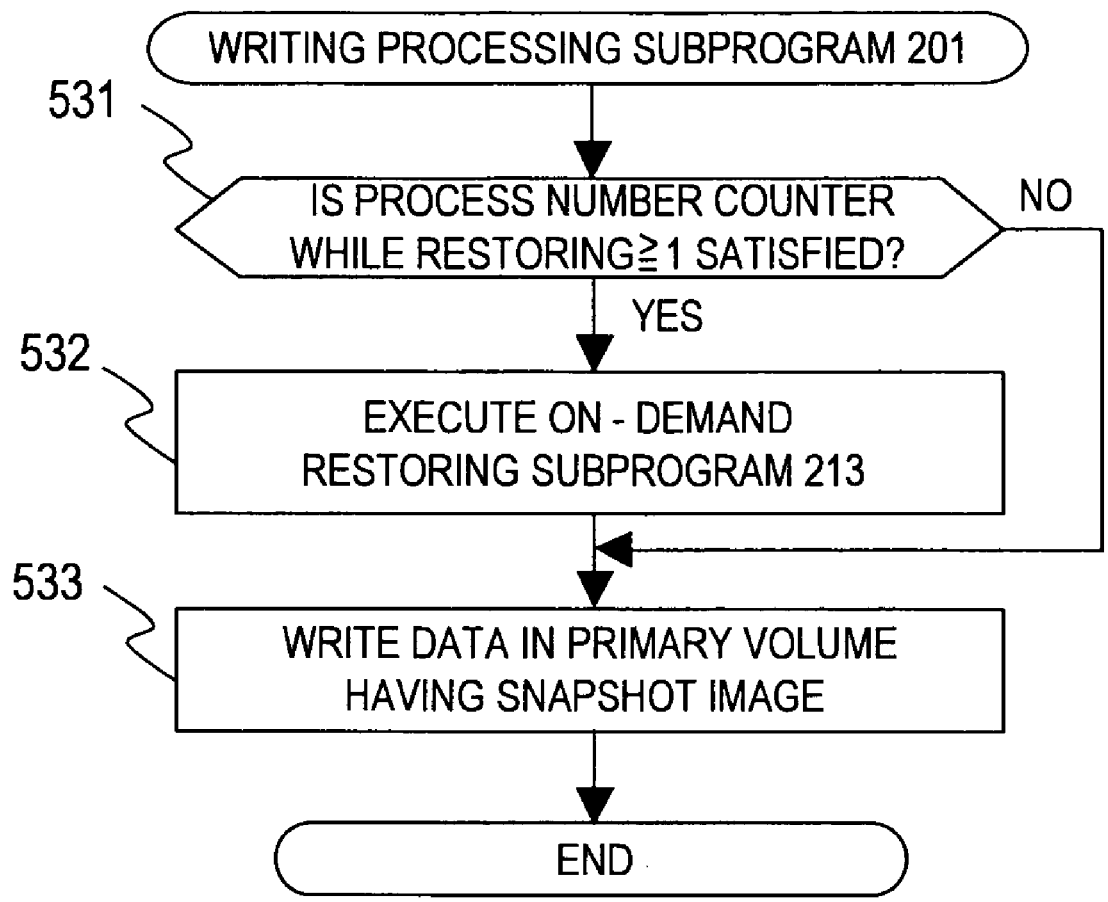
FIG. 11 is a flowchart showing processing of a writing processing subprogram.

FIG. 11 is a flowchart showing a processing flow of the writing processing subprogram 201. In the writing processing subprogram 201, upon reception of a writing request in the primary volume 141, checking is first made as to whether a value of the restoring process number counter 216 is 1 or more (531). If a value of the counter is not 1 or more (it is 0), as restoring has not been executed, normal data writing is carried out (533) to finish the processing. If a value of the counter is 1 or more, as restoring is on-going, the on-demand restoring subprogram 213 is executed (532), and then normal data writing is executed (533) to finish the processing.

Figure 12:
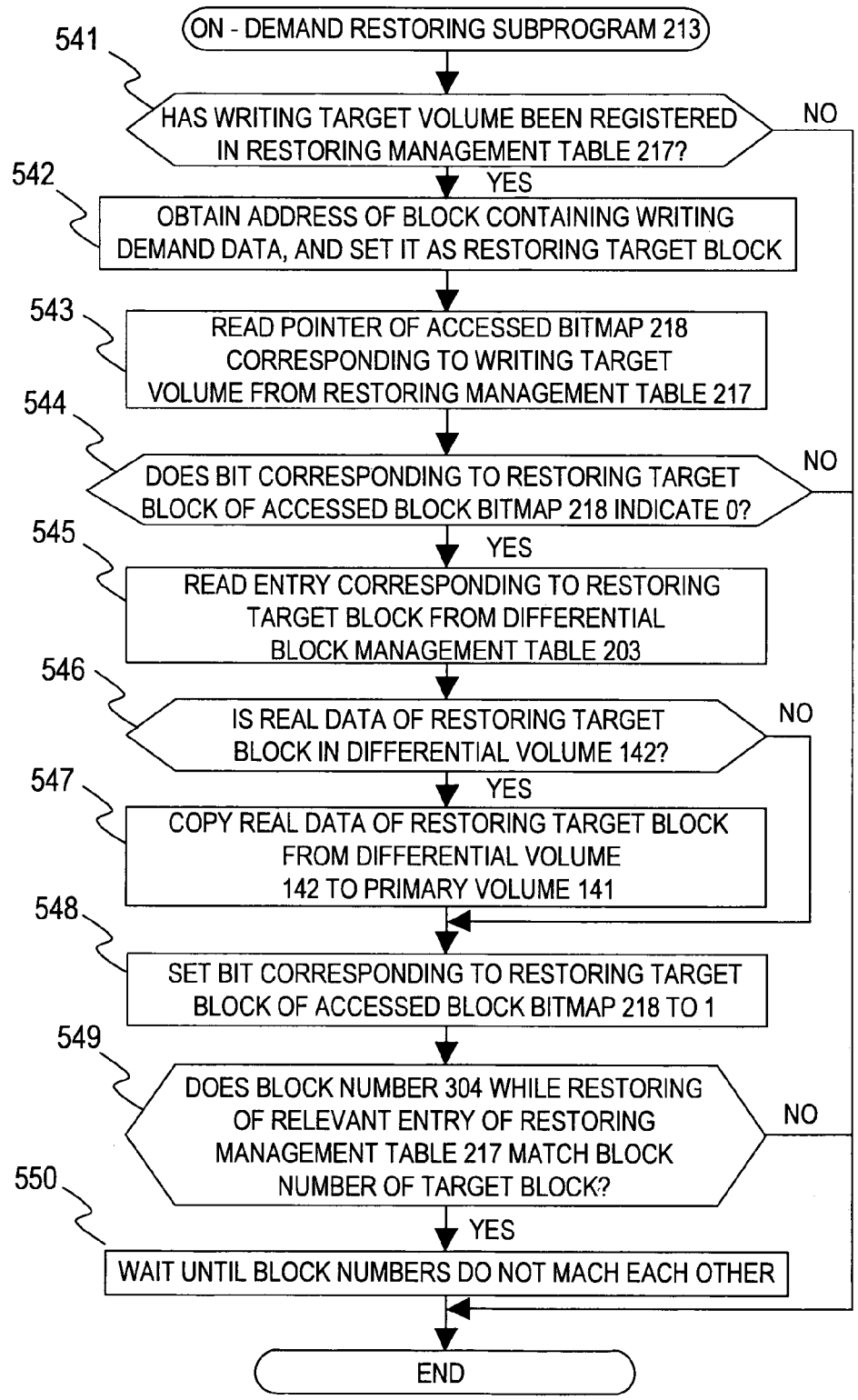
FIG. 12 is a flowchart showing processing of an on-demand restoring subprogram.

FIG. 12 is a flowchart showing a processing flow of the on-demand restoring subprogram 213. When the on-demand restoring subprogram 213 is loaded by the writing processing subprogram 201, checking is first made as to whether a writing target volume has been registered in the restoring management table 217 or not (541). If not registered, as its primary volume 141 is not a restoring source, nothing is executed to finish the subprogram. If registered, it can be understood that the primary volume is being restored as a restoring source on the background. In this case, the on-demand restoring subprogram 213 obtains an address of a data block containing writing request data to set it as a restoring target block (542). Subsequently, reference is made to the accessed block bitmap 218 from a pointer registered in the restoring management table 217 (544) to check whether a bit of the bitmap 218 corresponding to the restoring target block is 0 or 1 (545). If the bit of the bitmap 218 corresponding to the restoring target block is 1, as the block has already been restored, processing thereafter is not executed to finish the processing. If the bit of the bitmap 218 corresponding to the restoring target block is 0, an entry of the restoring target block is read from the differential block management table 203 (545). Then, checking is made as to whether data of the restoring target block has been retreated from the read entry to the management volume 142 or not (546). If real data of the restoring target data block has been stored in the differential volume 142, the real data is copied from the differential volume 142 to the restoring target data block of the primary volume 141 (547). If the real data of the restoring target data block has not been stored in the differential volume 142, as the real data is in the primary volume, step 547 is skipped to proceed to a next step. In a next step 548, the bit of the accessed block bitmap 218 corresponding to the restoring target block is set to 1 (548). Then, checking is made as to matching between a block number 304 while restoring in the entry of the restoring target block and the restoring target block (549). If both block numbers match each other, the processing waits until the block number 304 while restoring takes another value (550). This is carried out to prevent a situation where normal writing after the on-demand restoring subprogram 213 overtakes restoring being executed for the data block by the background restoring subprogram 213 in step 549, and data written by the normal writing is subsequently overwritten by old restore data. After an end of the waiting in step 550, the on-demand restoring processing is finished.

Through the processing operations of FIGS. 11 and 12, when a writing request comes from the NAS client 101 while restoring, the snapshot management program 113 of the NAS integrated system 104 combines contents of the primary volume 141 and the differential volume 142 according to a progress of restoring processing to execute accessing from a restoring source virtual snapshot volume 152 disguised as a virtual primary volume 151 after restoring. Thus, simultaneously with a start of restoring, accessing can be received from the NAS client 101 in a state after completion of restoring.

In other words, wiring is carried out in the primary volume 141 if restoring has been completed for the writing target block. On the other hand, if restoring has not been executed for the writing target block, data indicated by the snapshot volume 152 is written from the differential volume 142 to the primary volume 141, and then data requested to be written is written in the primary volume 141. In this case, the primary volume 141 is updated by the old data of the differential volume 142 to write new data because a restoring unit is not one block unit. Accordingly, the on-demand restoring subprogram 213 restores a position including a block for new writing, and then writes new data in the primary volume 141.

Thus, it is possible to surely prevent overwriting of new data by restoring processing while executing restoring by a plurality of block units to increase a restoring processing speed.

(Processing Flows of Reading Processing Subprogram and Block Address Converting Subprogram)

Figure 13:
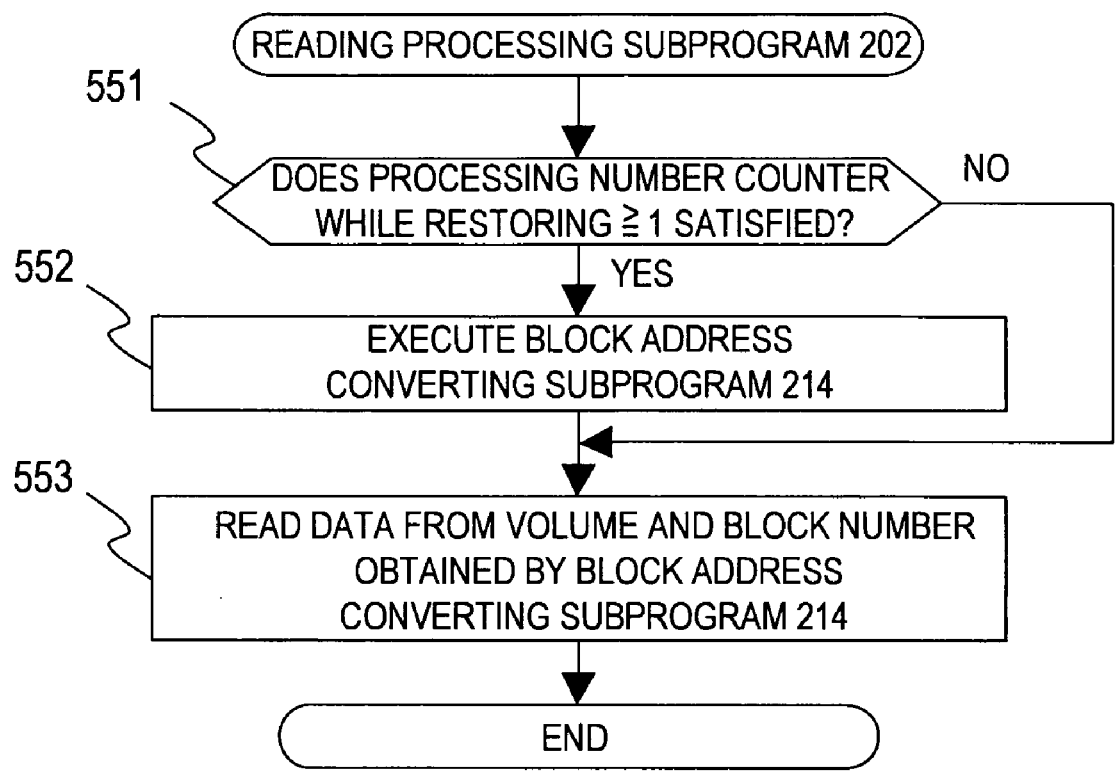
FIG. 13 is a flowchart showing processing of a reading processing subprogram.

FIG. 13 is a flowchart showing a processing flow of the reading processing subprogram 202. In the writing processing subprogram 202, upon reception of a reading request in the primary volume 141, checking is first made as to whether a value of the restoring process number counter 216 is 1 or more (551). If a value of the counter is not 1 or more (it is 0), as restoring has not been executed, normal data reading is carried out (553) to finish the processing. If a value of the counter is 1 or more, as restoring is on-going, the block address converting subprogram 214 is executed (532), and then normal data reading is executed (553) to finish the processing.

Figure 14:
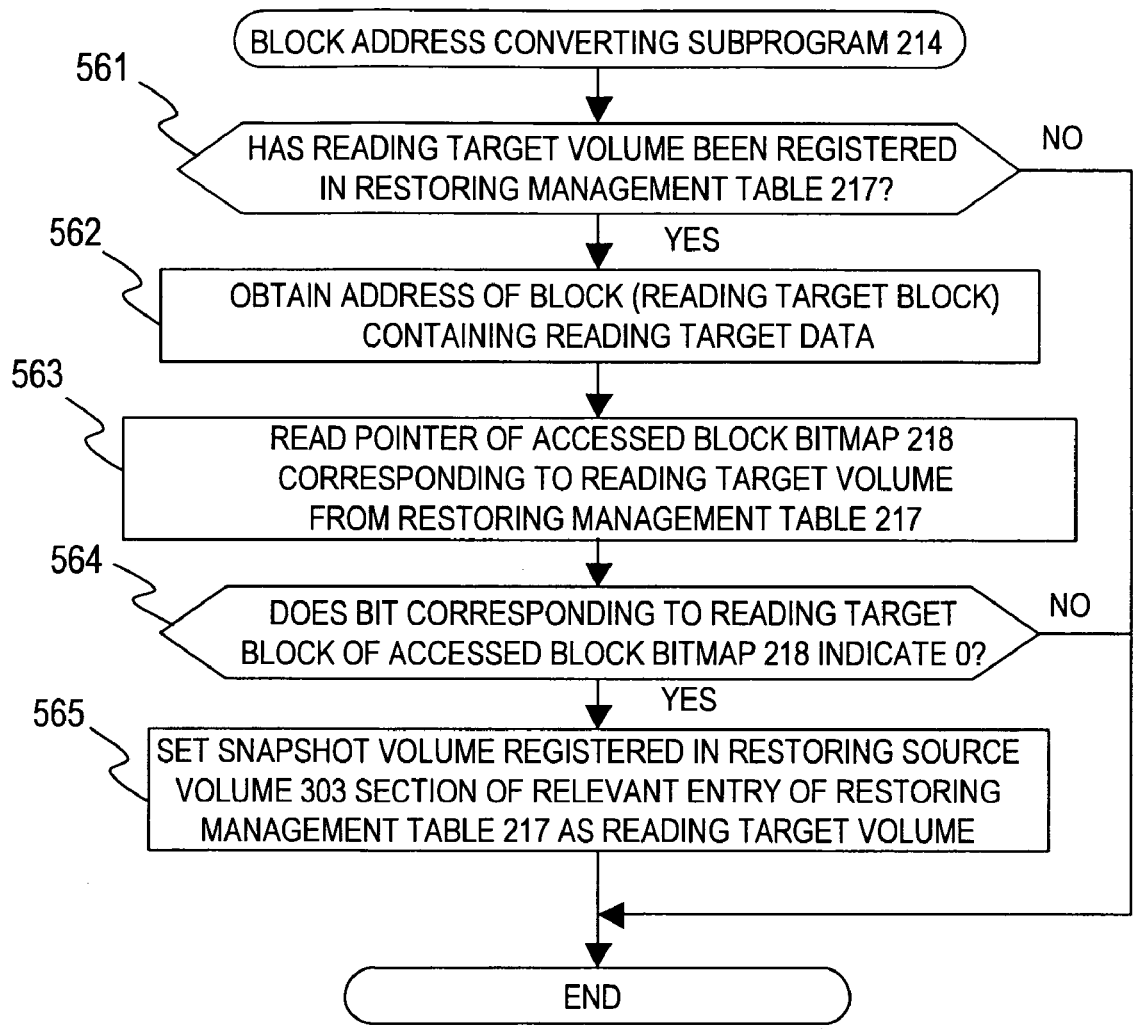
FIG. 14 is a flowchart showing processing of a block address converting subprogram.

FIG. 14 is a flowchart showing processing of the block address converting subprogram 214. When it is loaded by the reading processing subprogram 202, the block address converting subprogram 214 first checks whether a reading target volume has been registered in the restoring management table 217 or not (561). If not registered, as the volume is not being restored, the block address converting subprogram 214 executes nothing and ends the processing. If registered, as the volume is being restored, an address of a block including reading target data is obtained. Then, a pointer of the accessed block bitmap 218 corresponding to the reading target volume is read from the restoring management table 217 (563). Checking is made as to whether a bit of the accessed block bitmap 218 corresponding to the reading target block is 0 or not. If the bit is not 0 (it is 1), as the block has been restored and mapped in the primary volume 141, block address conversion is not executed to finish the processing. If the corresponding bit is 1, a virtual snapshot volume 152 registered in a restoring source volume of a relevant entry of the restoring management table 217 is set as the reading target volume (565).

Through the processing operations of FIGS. 13 and 14, when a referring request comes from the NAS client 101 while restoring, based on the restoring source virtual snapshot volume 152, the snapshot management program 113 of the NAS integrated system 104 accepts accessing by a virtual primary volume 151 disguising contents of the primary volume 141 and the differential volume 142 combined according to a progress of the restoring processing. Thus, simultaneously with a start of restoring, an access can be received in a state after restoring completion from the NAS client 101.

(Overall Operation)

Figure 15:
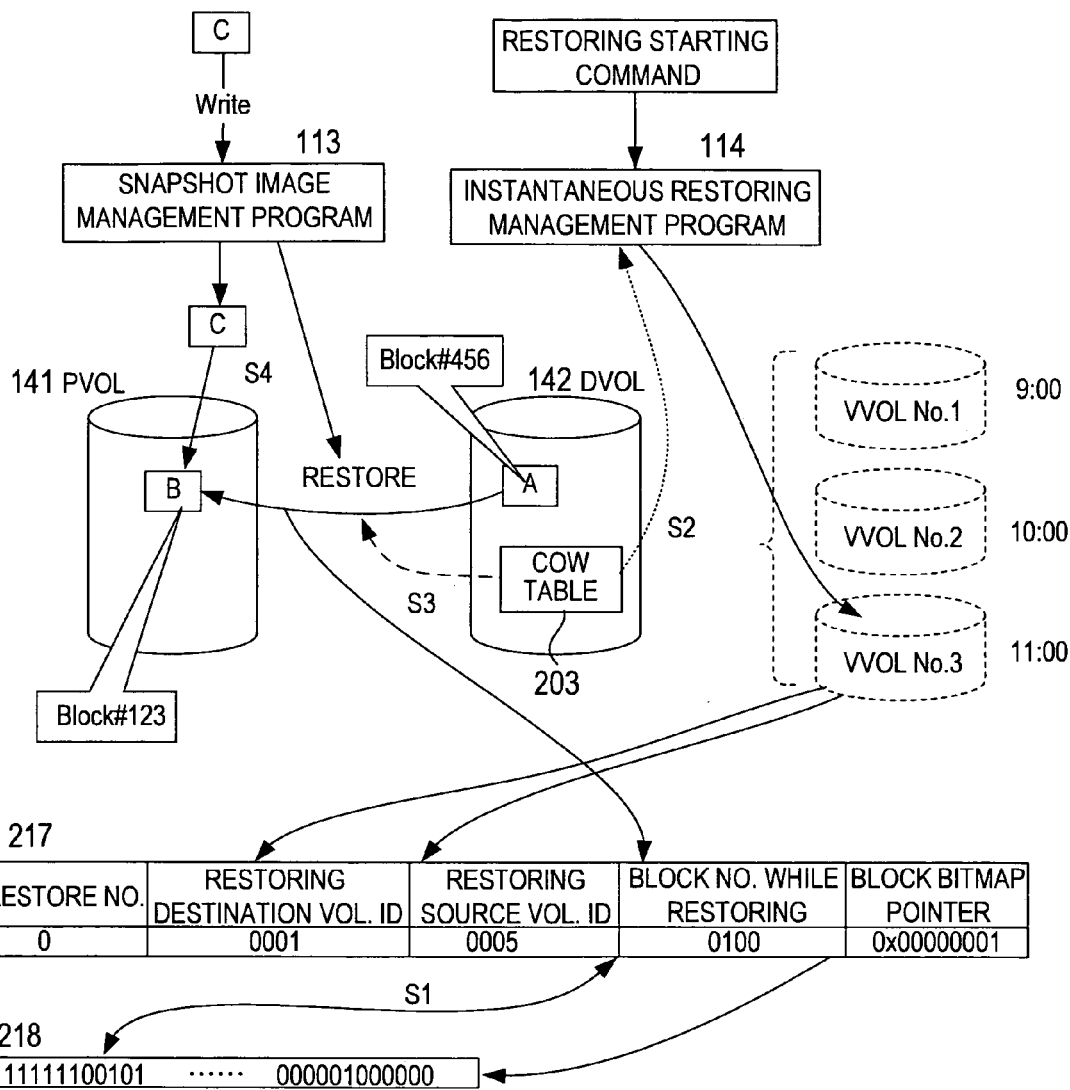
FIG. 15 is an explanatory diagram showing a processing flow when a writing request comes from a NAS client after a start of restoring processing.

FIG. 15 is an explanatory diagram showing a processing flow when a writing request comes from the NAS client 101 after a start of restoring processing. This example shows a case of restoring the primary volume 141 by using a virtual snapshot volume 152 (VVOL 3) at a time of 11:00 among plural generations of snapshots (9 o'clock, 10 o'clock, and 11 o'clock).

The NAS management terminal 102 designates a virtual snapshot volume 152 (VVOL 3) to instruct a start of restoring to the NAS integrated system 104. The NAS server subsystem 110 of the NAS integrated system 104 starts the instantaneous restoring management program 114 to allocate an accessed block bitmap 218, and sets a target volume in the restoring management table 217.

The instantaneous restoring management program 114 refers to the differential block management table 203 to set an identifier (0005 in this example) of a restoring source virtual snapshot volume 152 and an identifier (0001 in this example) of the primary volume 141, and starts restoring from the differential volume 142 to the primary volume 141.

In the restoring processing, as described above, reference is made to the restored block bitmap 218 corresponding to the block number 304 while restoring in the restoring management table 217 (S1), and reference is made to the differential block management table 203 when restoring is necessary (S2) to obtain data corresponding to the block from the differential volume 142. Then, the obtained data is copied to a block number of the primary volume 141 corresponding to the block number 304 (S3). When a block indicated by the block number 304 while restoring is 0 in the differential block management table 203, as data of the primary volume 141 is data to be restored, copying is not executed to proceed to next processing. This processing is executed from a predetermined position (e.g., head) of the primary volume 141, and repeated until all the bits of the restored block bitmap 218 become 1.

When the NAS server subsystem 110 receives a command of writing data C in the primary volume 141 from the NAS client 101 while restoring, the snapshot image management program 113 is started. The snapshot image management program 113 copies data A corresponding to the virtual snapshot volume 152 (VVOL 3) at a time of 11:00 from the differential volume 142 from its block 456 to a block 123 of the primary volume 141 by the on-demand restoring subprogram 213 (S3).

Upon completion of the restoring for the writing block, the snapshot management program 113 writes data C in the block 123 of the primary volume 141 to finish the processing. As described above, in the case of referring, data of the target block can be read from one of the differential volume 142 and the primary volume 141 based on the restored block bitmap 218 and the differential block management table 203.

As described above, according to this invention, the NAS client 110 can execute accessing in a state after restoring completion immediately after a start of restoring. Then, as the restoring processing only needs to copy the update difference data alone from the differential volume 142 to the primary volume 141, the amount of data to be transferred is reduced, whereby a load on the NAS integrated system 104 while restoring can be reduced. Thus, it is possible to prevent a reduction in accessing performance caused by a high load of the NAS different from the conventional case. Especially, when the amount of update differential data is small, the amount of data to be transferred from the differential volume 142 to the primary volume is reduced, whereby a load on the NAS integrated system 104 after seeming completion of restoring can be reduced.

As described above, according to this invention, it is possible to prevent a problem of a long-time reduction in a service level after service restoration even when the data update amount of the primary volume after acquisition of a snapshot is small, and a failure caused by a disk capacity shortage during primary volume restoring (restoring) in the instantaneous restoring of the NAS snapshot.

According to the embodiment, this invention is applied to the NAS integrated system 104. However, the invention may be applied to a storage system connected to SAN.

According to the embodiment, the primary volume 141 and the differential volume 142 are arranged in the same storage system. However, this invention can be applied to a case where the primary volume 141 and the differential volume 142 are arranged in different storage systems.

As apparent from the foregoing, this invention can be applied to the storage system which has the function of using a differential snapshot and the restoring function.

While the present invention has been described in detail and pictorially in the accompanying drawings, the present invention is not limited to such detail but covers various obvious modifications and equivalent arrangements, which fall within the purview of the appended claims.

What is claimed is:

1. A method for storing a snapshot, which causes a storage system to execute restoring processing by overwriting a primary volume with data of a snapshot volume, the storage system comprising: the primary volume for storing data to be accessed by a client computer; the snapshot volume for holding a snapshot of the primary volume; and a differential volume for storing differential data between the primary volume and the snapshot volume, the method comprising the steps of:

causing the storage system to receive a restoring starting command containing a restoring source snapshot volume from a management computer;

referring to a differential block management unit presetting in which of data blocks of the differential volume and the primary volume a data block of the restoring source snapshot volume is present based on the received restoring starting command to determine which of the primary volume and the differential volume a volume storing real data is for a restoring target data block;

copying data stored in the data block of the differential volume indicated by the differential block management unit to the data block of the primary volume to execute restoring when the restoring target data block is in the differential volume;

receiving a request of accessing the primary volume from the client computer while restoring;

switching to accessing to a virtual primary volume which provides a volume image after restoration where data of the primary volume and data of the differential volume are combined together based on the snapshot volume; and executing the accessing request from the client computer to the virtual primary volume.

2. The method for restoring a snapshot according to claim 1, wherein the step of receiving the restoring starting command containing the restoring source snapshot volume comprises the steps of:

referring to a restoring management table for managing a restoring progress of the snapshot volume and the primary volume while restoring to judge whether the primary volume corresponding to the snapshot volume has been registered or not in the restoring management table;

setting the snapshot volume as a restoring source volume and the primary volume as a restoring destination volume in the restoring management table when it is judged that the primary volume corresponding to the snapshot volume has not been registered in the restoring management table; and finishing the restoring processing when it is judged that the primary volume corresponding to the snapshot volume has been registered in the restoring management table.

3. The method for restoring a snapshot according to claim 2, wherein the step of executing the restoring comprises the steps of:

referring to an access management unit for holding accessing history while restoring for each data block of the restoring destination primary volume to judge presence of accessing history for the data block;

executing restoring of the data block when there is no accessing history for the data block, and finishing the restoring of the data block when there is accessing history for the data block; and setting accessing history for the data block of the access management unit.

4. The method for restoring a snapshot according to claim 3, wherein the step of setting the accessing history in the access management unit sets history of accessing a relevant data block of the access management unit after the copying when the restoring target data block is in the differential volume, and history of accessing a relevant data block of the access management unit when the restoring target data block is not in the differential volume.

5. The method for restoring a snapshot according to claim 3, wherein the step of executing the request of accessing the virtual primary volume from the client computer comprises the steps of:

referring, when the accessing request is reading, to the access management unit to read data from the data block of the primary volume when there is accessing history for a reading target data block; and referring, when the accessing request is reading, to the access management unit to read data from one of a differential volume and a primary volume corresponding to a data block of the restoring source snapshot volume by referring to the differential block management unit when there is no accessing history for the reading target data block.

6. The method for restoring a snapshot according to claim 5, wherein the step of reading the data from one of the differential volume and the primary volume corresponding to the data block of the restoring source snapshot volume refers to the differential block management unit to read data from the data block of the primary volume when the reading target data block is in a primary volume, and data from the data block of the differential volume indicated by the differential block management unit when the reading target data block is in a differential volume.

7. The method for restoring a snapshot according to claim 6, wherein the step of executing the request of accessing the virtual primary volume from the client computer comprises the steps of:

referring, when the accessing request is writing, to the access management unit to write the data of the data block of the primary volume when there is accessing history for a writing target data block;

referring, when the accessing request is writing, to the access management unit to execute restoring of the data block by referring to the differential block management unit when there is no accessing history for the writing target data block; and writing new data in the writing target data block of the primary volume after completion of the restoring.

8. The method for restoring a snapshot according to claim 7, wherein the step of executing the restoring of the data block by referring to the differential block management unit comprises the steps of:

referring to the differential block management unit to determine which of the primary volume and the differential volume a volume storing real data of the restoring target data block is; and copying data stored in the data block of the differential volume indicated by the differential block management unit to the data block of the primary volume to execute restoring when the restoring target data block is in the differential volume.

9. A storage system, comprising:

a primary volume which stores data to be accessed by a client computer;

a snapshot image management unit which creates a snapshot of the primary volume and manages the snapshot as a snapshot volume;

a differential volume which stores differential data between the primary volume and the snapshot volume; and a restore control unit which writes contents of the differential volume in the primary volume upon reception of a restoring starting command, the snapshot image management unit comprising:

a snapshot image creating unit which stores update differential data of the primary volume in the differential volume; and a differential block management unit which sets a correlation among a data block of the differential volume storing the update differential data, a data block of the primary volume of the update differential data, and a data block of the snapshot volume, the restore control unit comprising:

a restoring executing unit which writes the data block indicated by the differential block management unit from a restoring source snapshot volume designated by the restoring staring command in a data block of a restoring source volume by referring to the differential block management unit to execute restoring;

a restoring progress management unit which manages a progress of the restoring; and an access control unit while restoring which receives an accessing request from the client computer during the restoring, and executes the accessing request to a virtual primary volume after restoration where the primary volume and the differential volume are combined together based on the progress of the restoring progress management unit.

10. The storage system according to claim 9, wherein:

the restoring executing unit comprises:

a restoring target determining unit which refers to the differential block management unit to determine which of the primary volume and the differential volume a volume storing real data for a data block of a restoring target snapshot volume is; and a restore data transferring unit which copies the data stored in the data block indicated by the differential block management unit to the data block of the differential volume to execute restoring when the restoring target data block is in the differential volume;

the restoring progress management unit comprises:

a restoring management table which manages the snapshot volume, the primary volume while restoring, and a restoring progress; and an access management unit which holds accessing history by restoring for each data block of the restoring destination primary volume; and the restore data transferring unit refers to the access management unit for the restoring target data block to execute restoring for the data block when there is no accessing history, and sets accessing history for the data block of the access management unit.

11. The storage system according to claim 10, wherein the access control unit while restoring refers, when the accessing request is reading, to the access management unit to read data from the data block of the primary volume when there is accessing history for a reading target data block, and refers to the differential block management unit to read data from one of the differential volume and the primary volume corresponding to the data block of the restoring source snapshot volume when there is no accessing history.

12. The storage system according to claim 10, wherein the access control unit while restoring refers, when the accessing request is writing, to the access management unit to write data in the data block of the primary volume when there is accessing history for a writing target data block, and writes new data in the writing target data block of the primary volume after executing restoring for the data block of the primary volume when there is no accessing history.

\* \* \* \* \*